No. 677,190.  
Patented June 25, 1901.

L. N. DYHRBERG & G. K. ASKIN.
COMBINED BELT AND BRACES.
(Application filed Oct. 27, 1899.)

(No Model.)  
2 Sheets—Sheet 1.

Witnesses  
H. M. Gillman, Jr.  
H. G. Ogden, Jr.

Inventors  
Lawrence Nelson Dyhrberg  
George Kidd Askin  
by Foster Freeman  
Attorneys No. 677,190. Patented June 25, 1901.
L. N. DYHRBERG & G. K. ASKIN.
COMBINED BELT AND BRACES.
(Application filed Oct. 27, 1899.)
(No Model.) 2 Sheets—Sheet 2.

UNITED STATES PATENT OFFICE.

LAVERUX NELSON DYHRBERG AND GEORGE KIDD ASKIN, OF ASHBURTON, NEW ZEALAND.

COMBINED BELT AND BRACES.

SPECIFICATION forming part of Letters Patent No. 677,190, dated June 25, 1901.

Application filed October 27, 1899. Serial No. 734,946. (No model.)

*To all whom it may concern:*

Be it known that we, LAVERUX NELSON DYHRBERG and GEORGE KIDD ASKIN, subjects of the Queen of Great Britain and Ireland, residing at Ashburton, Canterbury, in the Colony of New Zealand, have invented a new and useful Combined Belt and Braces, of which the following is a specification.

This invention is designed with the object of enabling the one article to be readily and quickly converted from a belt into a pair of braces, or vice versa.

The combined belt and braces is particularly adapted for use by athletes, cricketers, foot-ballers, and boating men and also for workingmen whose occupations require or necessitate physical exertion or for men having out-of-door occupations, as many such prefer to work with a belt in preference to braces. The combined belt and braces may also be worn to great advantage by men and youths generally regardless of their occupations.

Our combined belt and braces is exceedingly simple in construction, and whether used as a belt or braces comfort and freedom are obtained, while the article can be produced at a cost only a trifle more than that of an ordinary belt or a pair of braces, yet offering the advantage of both in one.

The combined belt and braces may be constructed of suitable material or combination of materials, according to requirements or to suit different tastes.

Our invention will be described with reference to the accompanying drawings, wherein—

Figure 1:
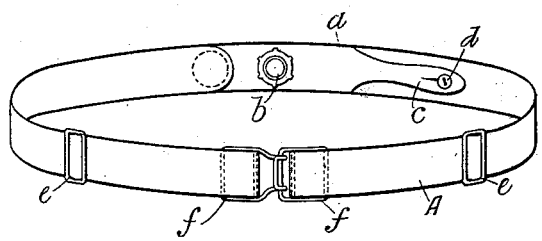
Figure 2:
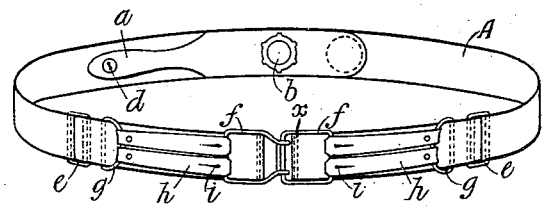
Figure 3:
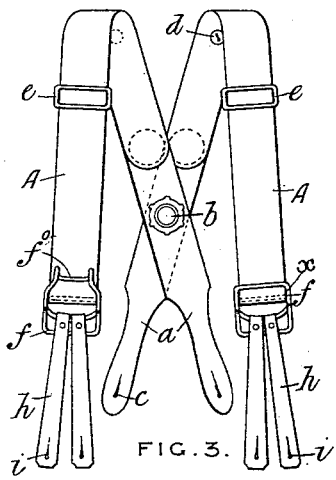
Figure 4:
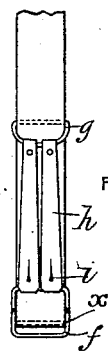
Figure 5:
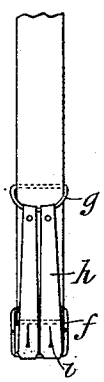
Figure 6:
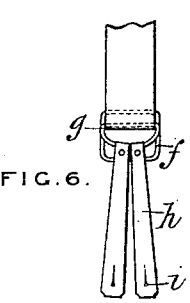
Figure 7:
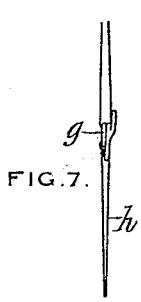
Figure 8:
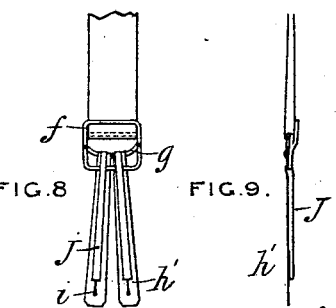
Figure 9:
Figure 14:
Figure 10:
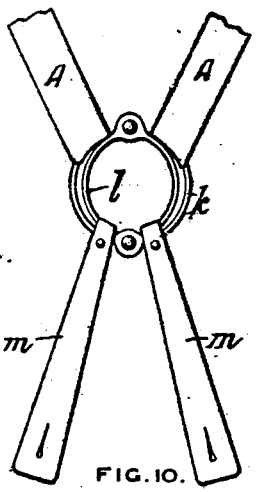
Figure 15:
Figure 11:
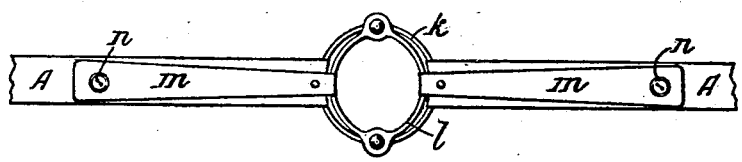
Figure 16:
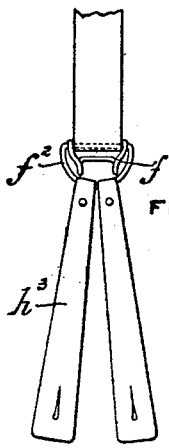
Figure 12:
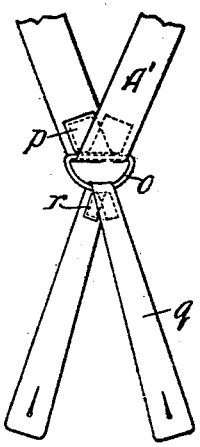
Figure 17:
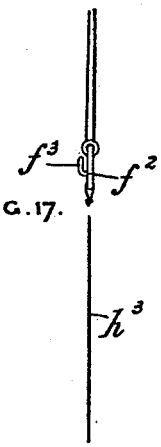
Figure 13:
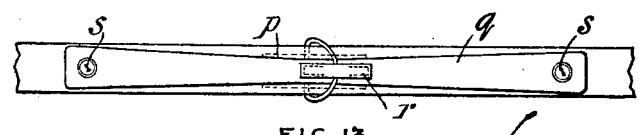

Figure 1 is a view of our invention in the form of a belt fastened. Fig. 2 is a view of same inside out, showing the movable parts hereinafter referred to. Fig. 3 is a view of our invention as formed into a pair of braces. Figs. 4, 5, 6, and 7 are views of one end of belt in different positions, as hereinafter explained. Figs. 8 and 9 are views of another form of strap-loop hereinafter explained. Figs. 10 and 11 show a modification of the arrangement of the connection of the bands at back, separate short straps being employed for fastening to trousers-buttons. Figs. 12 and 13 show another modified arrangement whereby a continuous band is employed instead of two bands connected together, a separate continuous short strap being used for fastening to trousers-buttons. Figs. 14 and 15 are front and side views, respectively, showing a modified form of front buckle, by the use of which the sliding ring or loop is dispensed with, the straps for securing to trousers-buttons being connected direct to said buckle. Figs. 16 and 17 are front and side views, respectively, showing another modified form of front buckle consisting of two parts hereinafter explained.

The main band, which is adapted to form the body of the belt or the shoulder-straps of the braces, may be either a single piece, as indicated by A' in Fig. 12, or it may be in two sections, (indicated by A in Figs. 1, 2, 3, 10, and 11.) Such band may be of any suitable material, either leather, webbing, or such like material, and it may be elastic or only partly elastic. When the band is made of two sections, such sections must be so connected to each other as to be capable of being brought into alinement with each other to form the belt-body or to extend at an angle to each other to form the shoulder-straps of the braces. Such connection may be accomplished in various ways, and in Figs. 1, 2, and 3 I have illustrated a simple pivot connection between the two sections. In these figures the rear suspender-tabs are indicated by *a*, and they are preferably of leather and firmly secured to the sections A by stitching or otherwise, and they thus form continuations of the sections A. At a suitable distance from the buttonholes *c* in the ends of the tabs the two band-sections are pivotally joined or connected, as indicated at *b*, and such sections are free to turn on the pivot into alinement with each other, as shown in Figs. 1 and 2, to form the belt-body or to extend at an angle to each other, as shown in Fig. 3, to form the braces. Each section A is provided with a button *d*, to which the respective tabs *a* are secured by means of the buttonholes *c* when the article is used as a belt and which is clearly indicated in Figs. 1 and 2.

Each end of the main band is passed through a buckle *e* in the usual way, then around the cross-bar *x* of a belt-fastening *f*, and then back to the buckle e, to the center bar of which the end is secured on the inner side of the buckle. A loop is thus formed at each end of the band, in which the respective fastenings f are supported by means of their crossbars x. Within the loop thus formed at each end of the main band a metal ring g is inserted and which is free to slide within the loop. To each of these rings g a pair of front suspender-tabs h are secured, each of such tabs being provided with a buttonhole i. The tabs h (illustrated in Figs. 1 to 7, inclusive) are in the form of a loop—that is, each consists of a strip of material folded upon itself— and the ring g extends through the loop formed at the fold, and the two plies of the tabs may be secured together adjacent to the ring g by a rivet or stitching, as preferred. The outer ends of the two plies will also be connected by stitching or otherwise, and one of the end bars of the fastening f extends through between the plies of both tabs and is free to slide from end to end of the tabs. The end bar of the fastening f, which extends between the plies of the tabs h, is preferably the most remote from the cross-bar x, and in one of such fastenings the space between the cross-bar x and the other end bar of the fastening forms an eye, (indicated by y in Fig. 4.) The fastening f at the other end of the band A is of a different shape and is bent to form a hook, (indicated by $f^0$ in Fig. 3,) such hook being adapted to engage the eye y of the other fastening f.

To convert the device from a belt, as shown in Figs. 1 and 2, into a pair of braces, as shown in Fig. 3, the tabs a are released from the buttons d and the sections A turned upon the pivot b to cause them to extend at an angle to each other, as indicated in Fig. 3. The hook $f^0$ will of course have been disengaged from the eye y. The outer ends of the tabs h, together with the end bar of the fastening f, which lies within them, will then be grasped by one hand and the band A by the other, and by pulling on the tabs and bar the fastening f, tabs h, and ring g will move from the positions shown in Fig. 4 to those shown in Fig. 5, the fastening f turning upon its cross-bar x, which lies within the loop at the end of the band A. The tabs h should then be pulled farther forward, sliding over the end bar of the fastening f until the tabs and the ring g reach the position indicated in Fig. 3, when the device will be ready for use as a pair of braces. This operation is reversed to convert the braces into a belt.

Referring to Figs. 8 and 9, which show a front and side view, respectively, of another form of front suspender-tabs which may be used, if desired, in this construction, the tab $h'$ consists of a single ply of material secured at one end to the ring g and provided at its other end with a buttonhole i, and in order to form the loop in which the end bar of the fastening f may slide a strip of leather or other suitable material j is secured at each end to the tab $h'$ by any suitable means, such as stitching or riveting.

In Figs. 10 and 11 is shown another means for connecting the two sections of the main band to each other, so that they may be brought into alinement with each other or extend at an angle to each other. In this construction a ring k is provided having an inner ring l attached thereto. The sections of the band are attached to the ring k, so as to slide freely thereon, and the rear suspender-tabs (in this case indicated by m) are attached to the inner ring l, so as to slide freely thereon. As shown in Fig. 10, the parts are in the positions they will occupy when the device is used as a pair of braces. When used as a belt, the sections A will be drawn in line with each other, as indicated in Fig. 11, and the tabs m will also be drawn in line with each other and also with the sections A and secured in position by means of buttons n on the sections A, with which the buttonholes of the tabs engage.

Referring to Figs. 12 and 13, a continuous band (indicated by A') is employed instead of two sections, as before described. A link or loop o is attached thereto substantially midway the ends of the band A' and is secured against undue movement by a small band or strip of suitable material p, which is secured to the band A' by stitching or otherwise. In this case also the rear suspender-tabs are formed of a single piece q, folded midway its ends and attached to the loop o and held in position thereon by a small band or strip r, secured to the tabs by stitching or otherwise. When used as a belt, the band A' is straightened out and also the strip q and the latter held in place in line with the band by buttons s, as shown in Fig. 13.

Referring to Figs. 14 and 15, the front suspender-tabs (here indicated by $h^2$) are secured directly to one of the end bars of the fastening, (indicated by $f'$.) In this case the sliding ring g is dispensed with. When the device is to be used as a belt, the fastening is turned end for end from the position shown in Fig. 14, and the tabs $h^2$ may then be laid flat against the inside of the band, and they need not necessarily be fastened to the band, as when the belt is being worn the pressure of the band against the body will hold them in place.

Referring to Figs. 16 and 17, the front ends of the band are respectively connected to a D-shaped link or loop $f^2$, to which are also connected the front suspender-tabs $h^3$. A hook or clasp $f^3$ is pivotally attached to the straight bar of one link or loop, so as to act independently. A similar clasp, but without a hook, is attached to the other link or hook and forms an eye, with which the hook may engage. The hook may be turned inward or outward, as desired.

Having now described our invention, what we claim as new, and desire to secure by Letters Patent, is—

1. In combined braces and belt, the combination of the main band adapted to form the shoulder-straps of the braces or the body of the belt, rear suspender-tabs connected to said band substantially midway its length, means to detachably secure the said tabs to the band in line with each other and with the band, and a belt-fastening device connected to each end of the band, said devices adapted to engage each other to secure the belt in position around the body of the wearer, substantially as set forth.

2. In combined braces and belt, the combination of the main band adapted to form the shoulder-straps of the braces or the body of the belt, said band being in two sections, a connecting device to which adjacent ends of the sections are loosely attached to permit them to be moved into alinement or at an angle to each other, rear suspender-tabs also loosely attached to said connecting device and movable to bring them at an angle to each other or into alinement with each other and with the sections of the band, means to detachably secure said tabs to the band-sections in alinement therewith, and a belt-fastening device connected to the free end of each section, said belt-fastening devices adapted to engage each other to secure the belt in position on the wearer, substantially as set forth.

3. In combined braces and belt, the combination of the main band adapted to form shoulder-straps of the braces or the body of the belt, said band being in two sections, a ring to which adjacent ends of the sections are loosely attached to permit them to be moved into alinement or at an angle to each other, an inner ring connected to the first-named ring, rear suspender-tabs loosely attached to said inner ring and movable thereon to bring them at angle to each other or in alinement with each other and with the sections of the band, means to detachably secure said tabs to the band-sections in alinement therewith, and a belt-fastening device connected to the free end of each section, said belt-fastening devices adapted to engage each other to secure the belt in position on the wearer, substantially as set forth.

4. In combined braces and belt, the combination of the main band adapted to form the shoulder-straps of the braces or the body of the belt, rear suspender-tabs connected to said band substantially midway its ends, means to detachably secure the said tabs to the band in line with each other and with the band, a belt-fastening device connected to each end of the band, and front suspender-tabs connected to each end of the band and movable in respect thereto to lie against the outer face of the band and in line therewith, substantially as set forth.

5. In combined braces and belt, the combination of the main band adapted to form the shoulder-straps of the braces or the body of the belt, said band being in two sections, a connecting device to which adjacent ends of the sections are loosely attached to permit them to be moved into alinement or at an angle to each other, rear suspender-tabs also loosely attached to said connecting device and movable thereon to extend at an angle to each other or in alinement with each other and the sections of the bands, means to detachably connect the tabs to the band-sections in alinement therewith, a belt-fastening device connected to the free end of each section, and front suspender-tabs connected to the free end of each section and movable in respect thereto to lie against the outer face of the band and in line therewith, substantially as set forth.

6. In combined braces and belt, the combination of the main band adapted to form the shoulder-straps of the braces or the body of the belt, said band having a loop at each end, rear suspender-tabs connected to said band substantially midway its length, means to detachably connect the said tabs to the band in line with each other and with the band, a ring slidably mounted in the loop at each end of the band, a pair of front suspender-tabs secured to each ring, and each tab having a longitudinally-extending loop, a belt-fastening for each end of the band, each fastener having a cross-bar between its end bars which extends through and is supported in one of the end loops of the band, one of the end bars of each fastener also extending through the loops of the adjacent front suspender-tabs, said belt-fasteners adapted to engage each other to secure the belt in position on the wearer, and said front tabs being movable longitudinally with respect to the belt-fasteners, substantially as set forth.

In witness whereof we have signed our names to this specification in the presence of two witnesses.

LAVERUX NELSON DYHRBERG.
GEORGE KIDD ASKIN.

Witnesses:
A. H. HART,
GEORGE HART.